US009928483B2

(12) United States Patent
Cotten et al.

(10) Patent No.: US 9,928,483 B2
(45) Date of Patent: Mar. 27, 2018

(54) AUTOMATED TOPOLOGY CHANGE DETECTION AND POLICY BASED PROVISIONING AND REMEDIATION IN INFORMATION TECHNOLOGY SYSTEMS

(75) Inventors: Ronald Dean Cotten, Commerce, CO (US); Richard David Haase, Denver, CO (US); Kevin Dean Wein, Broomfield, CO (US); James Edward Borowicz, Westminster, CO (US); Madhukar Bandi, Superior, CO (US); Eric Alden Rumer, Erie, CO (US); Craig W. Hotes, Denver, CO (US)

(73) Assignee: Level 3 Communication, LLC, Broomfield, CO (US)

( * ) Notice: Subject to any disclaimer, the term of this patent is extended or adjusted under 35 U.S.C. 154(b) by 1543 days.

(21) Appl. No.: 13/092,093

(22) Filed: Apr. 21, 2011

(65) Prior Publication Data

US 2012/0271937 A1 Oct. 25, 2012

Related U.S. Application Data

(60) Provisional application No. 61/477,598, filed on Apr. 20, 2011.

(51) Int. Cl.
*G06Q 10/10* (2012.01)
(52) U.S. Cl.
CPC .................................. *G06Q 10/10* (2013.01)
(58) Field of Classification Search
CPC ...................................................... G06Q 10/10
See application file for complete search history.

(56) References Cited

U.S. PATENT DOCUMENTS

| 6,271,845 | B1 * | 8/2001 | Richardson | H04L 41/0893 |
| | | | | 715/764 |
| 7,139,823 | B2 * | 11/2006 | Benfield | H04L 41/0213 |
| | | | | 709/224 |
| 7,146,568 | B2 * | 12/2006 | Richardson | H04L 41/0893 |
| | | | | 715/736 |
| 7,162,539 | B2 * | 1/2007 | Garcie-Luna-Aceves | |
| | | | | G06F 12/1483 |
| | | | | 707/E17.12 |
| 7,293,080 | B1 * | 11/2007 | Clemm | H04L 12/00 |
| | | | | 370/254 |
| 7,502,850 | B2 * | 3/2009 | Fellenstein | G06F 9/5072 |
| | | | | 709/205 |
| 7,650,637 | B2 * | 1/2010 | Li | H04L 12/4641 |
| | | | | 370/229 |
| 7,743,142 | B2 * | 6/2010 | Fellenstein et al. | 709/224 |
| 7,801,976 | B2 * | 9/2010 | Hodges et al. | 709/223 |
| 7,856,486 | B2 * | 12/2010 | Robertson et al. | 709/220 |
| 7,925,981 | B2 * | 4/2011 | Pourheidari et al. | 715/744 |
| 8,130,698 | B2 * | 3/2012 | Cheol | H04W 88/02 |
| | | | | 370/311 |
| 8,136,118 | B2 * | 3/2012 | Di Luoffo | G06F 9/5088 |
| | | | | 718/102 |

(Continued)

FOREIGN PATENT DOCUMENTS

WO  WO 03090035 A2 * 10/2003  .......... H04J 14/0221

*Primary Examiner* — Andrew Lai
*Assistant Examiner* — Hoyet H Andrews, III (57) ABSTRACT

Aspects of the present disclosure involve systems, methods, computer program products, and the like, that provide automated topology change detection and policy based provisioning and remediation in information technology systems, among other functions and advantages.

14 Claims, 12 Drawing Sheets

(56) References Cited

U.S. PATENT DOCUMENTS

| | | | |
|---|---|---|---|
| 8,171,354 B2* | 5/2012 | Tanaka | H04L 1/242 370/233 |
| 8,185,916 B2* | 5/2012 | Toussaint et al. | 719/328 |
| 8,200,789 B2* | 6/2012 | Boutboul | H04L 41/12 709/220 |
| 8,219,654 B2* | 7/2012 | Nagaraja et al. | 709/223 |
| 8,275,881 B2* | 9/2012 | Fellenstein | G06F 9/5011 709/224 |
| 8,346,591 B2* | 1/2013 | Fellenstein | G06Q 40/04 703/2 |
| 8,355,940 B2* | 1/2013 | Channabasavaiah et al. | 705/7.11 |
| 8,387,058 B2* | 2/2013 | Fellenstein | G06F 9/50 706/45 |
| 2002/0124094 A1* | 9/2002 | Chang | H04L 41/046 709/230 |
| 2003/0002103 A1* | 1/2003 | Erfani | H04Q 11/0062 398/82 |
| 2003/0009553 A1* | 1/2003 | Benfield | H04L 41/0213 709/224 |
| 2003/0061339 A1* | 3/2003 | Benfield | H04L 41/0213 709/224 |
| 2003/0126241 A1* | 7/2003 | Nagura | H04L 29/12009 709/221 |
| 2004/0208528 A1* | 10/2004 | Adleman | H04B 10/0773 398/33 |
| 2005/0044211 A1* | 2/2005 | Adhikari | H04L 69/40 709/224 |
| 2006/0080417 A1* | 4/2006 | Boutboul | H04L 41/12 709/220 |
| 2006/0133405 A1* | 6/2006 | Fee | H04L 12/2856 370/437 |
| 2006/0190583 A1* | 8/2006 | Whalen | 709/223 |
| 2007/0011301 A1* | 1/2007 | Ong | H04L 61/2015 709/224 |
| 2007/0106768 A1* | 5/2007 | Frietsch | H04L 41/06 709/223 |
| 2007/0204017 A1* | 8/2007 | Maes | 709/223 |
| 2007/0206512 A1* | 9/2007 | Hinds | H04L 41/12 370/254 |
| 2008/0016198 A1* | 1/2008 | Johnston-Watt | H04L 67/104 709/223 |
| 2008/0098457 A1* | 4/2008 | Carter | 726/2 |
| 2008/0159169 A1* | 7/2008 | Benfield | H04L 41/0213 370/254 |
| 2008/0172732 A1* | 7/2008 | Li | H04L 12/4641 726/15 |
| 2008/0275984 A1* | 11/2008 | Ullmann | H04L 41/0213 709/224 |
| 2009/0252063 A1* | 10/2009 | Owen | H04L 12/2807 370/255 |
| 2010/0218084 A1* | 8/2010 | Sivadas et al. | 715/234 |
| 2010/0333060 A1* | 12/2010 | Kirchgaessner et al. | 717/102 |
| 2011/0145399 A1* | 6/2011 | Jeyapaul et al. | 709/224 |
| 2012/0254431 A1* | 10/2012 | Kylau et al. | 709/226 |

* cited by examiner

| APP NAME | APP VERSION | SERVER | APPEARED | LAST SEEN |
|---|---|---|---|---|
| DDM CORE (DDMCORE02.PROD.IDCL.LEVEL3.COM) | | DDMCORE02.PROD | DATE 9:01:00 AM | DATE 9:02:00 AM |
| DDM PROBE (CDC1DDM0001) | | CDC1DDM0001 | DATE 9:01:00 AM | DATE 9:02:00 AM |
| DDM PROBE (VADCDDM0001) | | VADCDDM0001 | DATE 9:01:00 AM | DATE 9:01:00 AM |
| DDM PROBE (VAUSDDM0001.BRW.CORVIS) | | VAUSDDM0001 | DATE 9:01:00 AM | DATE 9:02:00 AM |
| DDM PROBE (VIDCDDM0001) | | VIDCDDM0001 | DATE 9:01:00 AM | DATE 9:02:00 AM |
| DDM PROBE (VIDCDDM0002) | | VIDCDDM0002 | DATE 9:01:00 AM | DATE 9:02:00 AM |
| DDM PROBE (VLDCDDM0001) | | VLDCDDM0001 | DATE 9:01:00 AM | DATE 9:02:00 AM |
| ORACLE (DDMPRD2) | 9.2.0.5.0 | F11V33-06 | DATE 8:10:00 AM | DATE 9:02:00 AM |

AUTOMATED TOPOLOGY CHANGE DETECTION AND POLICY BASED PROVISIONING AND REMEDIATION IN INFORMATION TECHNOLOGY SYSTEMS

CROSS-REFERENCE TO RELATED APPLICATION

This non-provisional utility application claims priority under 35 U.S.C. § 119(e) to co-pending provisional application No. 61/477,598 titled "Automated Topology Change Detection and Policy Based Provisioning and Remediation in Information Technology Systems," filed on Apr. 20, 2011, the disclosure of which is hereby incorporated by reference herein.

FIELD OF THE INVENTION

Aspects of the present invention involve information technology systems and methods and systems for managing the same.

BACKGROUND

Large scale information technology (IT) operational environments are common in many different organizations, such as universities, telecommunications companies, professional organizations, and the like. Such large scale IT environments have many common attributes and are faced with many common issues in managing all of the IT resources. For example, large scale IP environments often include geographically distributed data centers, hundreds or thousands of physical servers from multiple vendors, numerous different operating system (OS) variants and versions, increasing use of virtualization to maximize infrastructure utilization and minimize cost, hundreds or thousands of commercial off the shelf (COTS) and custom application deployments. Moreover, IT professionals in such environments, along with the IT environment itself, are responsible for hundreds of mission critical business services, must rapidly set up, provision and tear down environments required to keep pace with business, and must address legacy infrastructure and applications inherited through acquisition.

In such an IT environment there are numerous common operational problems. For example, large numbers of applications and business services are deployed with complex or unknown interdependencies. Lack of visibility into current application topologies and dependencies prevents effective implementation of service impact management and service level management solutions for mission critical applications. Moreover, critical information about IT infrastructure and applications is historically maintained manually in multiple locations and formats by many different people and organizations. Implicit in this recognition is that critical knowledge about various applications, interdependencies, systems and the like is owned by people. Reductions in IT staff and off-shoring accelerates loss of knowledge about business critical applications and systems exposing companies to significant risk. Similarly, critical information required for operational support is not available, updated or otherwise accessible resulting in higher mean time to repair (MTTR) and cost to business. All of these difficulties are exaggerated by the high level of change in some environments making maintenance of current state of operational environment difficult to manage and costly.

It is with these and other issues in mind that various aspects of the present disclosure were developed.

SUMMARY

Aspects of the present disclosure involve systems, methods, computer program products, and the like, that provide automated topology change detection and policy based provisioning and remediation in information technology systems, among other functions and advantages.

One particular aspect of the present disclosure involves a method of managing an information technology system. The method includes automatically detecting a topology change of a service in an information technology environment. The topology change involves or is otherwise associated with a change to at least one component of the service. The method further involves automatically provisioning and/or automatically remediating the at least one component of the service based on a policy.

Another aspect of the present disclosure involves a system for information technology management including one or more processors coupled with one or more tangible computer readable media containing instructions, which when executed, perform the operations of automatically detecting a topology change of a service in an information technology environment, the topology change involving a change to at least one component of the service and automatically provisioning or automatically remediating the at least one component of the service based on a policy.

Another aspect of the present disclosure involves a method of managing an information technology system including applying a unique pattern of a particular service to automatically discovered discovery and dependency mapping of an IT environment in a first state and the IT environment in a second state to identify components of the particular service in the first state and the second state. The method further involves identifying component topology changes of the particular service between the first state and the second state. Finally, the method involves automatically altering some or all components of the service associated with the topology change based on a policy.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Aspects of the present disclosure involve information technology automation, auto-discovery systems, configuration management, configuration management data quality, and various methods, systems, and computer program products concerning the same. One particular aspect involves automatic discovery of IT infrastructure (e.g., chassis model, processor cores, installed memory, attached storage, network interfaces, operating systems, applications, databases, etc.) and comparison of the IT infrastructure against one or more fingerprints associated with particular services of the IT infrastructure. From the comparison, service attributes may be extracted and stored in a configuration management database. The extracted attributes define the state of a particular service at a given time. Each time an autodiscovery scan is completed, the attributes of the service may be extracted and used to identify any changes to the service (e.g., by comparing against the previous extracted attributes). Policy based remediation may then be conducted for the service, and particularly for any changed aspect of the service.

Figure 1:
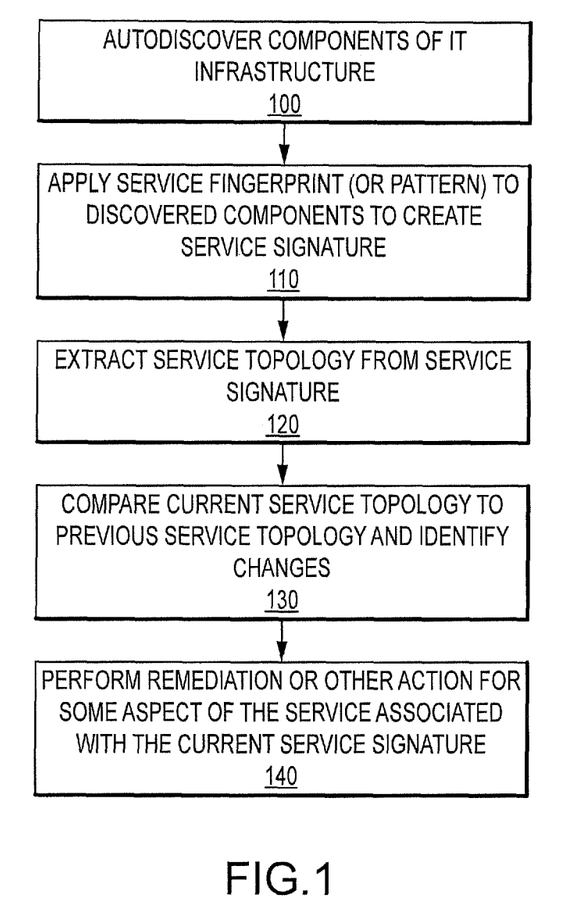
FIG. 1 is a flowchart illustrating a method of automated topology change detection and policy based provisioning and remediation in information technology systems.

FIG. 1 is a flowchart illustrating one possible method of automated topology change detection and policy based provisioning and remediation in information technology systems. To begin, auto-discovery is conducted against some or all of an IT environment (operation 100). Auto-discovery identifies various components of the IT infrastructure, including hardware, software and relationships between various components of the IT infrastructure.

A fingerprint or pattern is applied to the auto-discovered components to generate a service signature (operation 110). A particular fingerprint or pattern may be generated, obtained or otherwise provided for various existing or possible services provided by the IT infrastructure. For example, a unique fingerprint may exist for an email service, a unique fingerprint may exist for a word processing service, and unique signatures may exist for numerous other possible services provided by the IT infrastructure. A fingerprint identifies various attributes of a given service including software applications, databases, communication links, dependencies, hardware, etc., and the relationships between the same. Stated differently, a service fingerprint identifies IT components involved in the provision of a service.

Application of the fingerprint against the auto-discovered IT infrastructure generates a signature for the service. The signature is a contemporaneous representation of all IT aspects of a particular service including the software applications installed, software applications running, the hardware (e.g., servers) upon which the software is installed and/or running, operating systems, database instantiations, connections to databases, connections between components, and the like. Thus, a unique service fingerprint is applied against auto-discovered IT infrastructure components to provide a snapshot of the components involved in the provision of the service. In one specific arrangement, a fingerprint involves a query of the auto-discovered IT components, and any results of the query are exported as an object.

From the signature, the topology of the service is extracted and saved (operation 120). In one example, service memberships are extracted and populate a configuration management database. In this way, the topology of a given service is saved for some point in time. The preceding steps may be repeated at some other point in time and the topology for the service again saved in a configuration management database. Similarly, the topology of the service may exist for the IT infrastructure in a first state and infrastructure in a second state, where the IT infrastructure in each state is associated with some alteration. Thus, the topology of a service (or other aspect of the IT infrastructure) exists for two different points in time, and/or states. Accordingly, through comparison (operation 130), topology changes to the service may be identified. For example, if a database application associated with a given service is moved from one server to another for some reason, one topology will provide information associating the database with the first server, and the topology obtained after the change will provide information associating the database with the second server. The system will detect the change and some form of remediation or other work may be performed on the service components generally or the changed service components (operation 140). The remediation or other form of change to the components of the service may be based on an IT policy.

Figure 2:
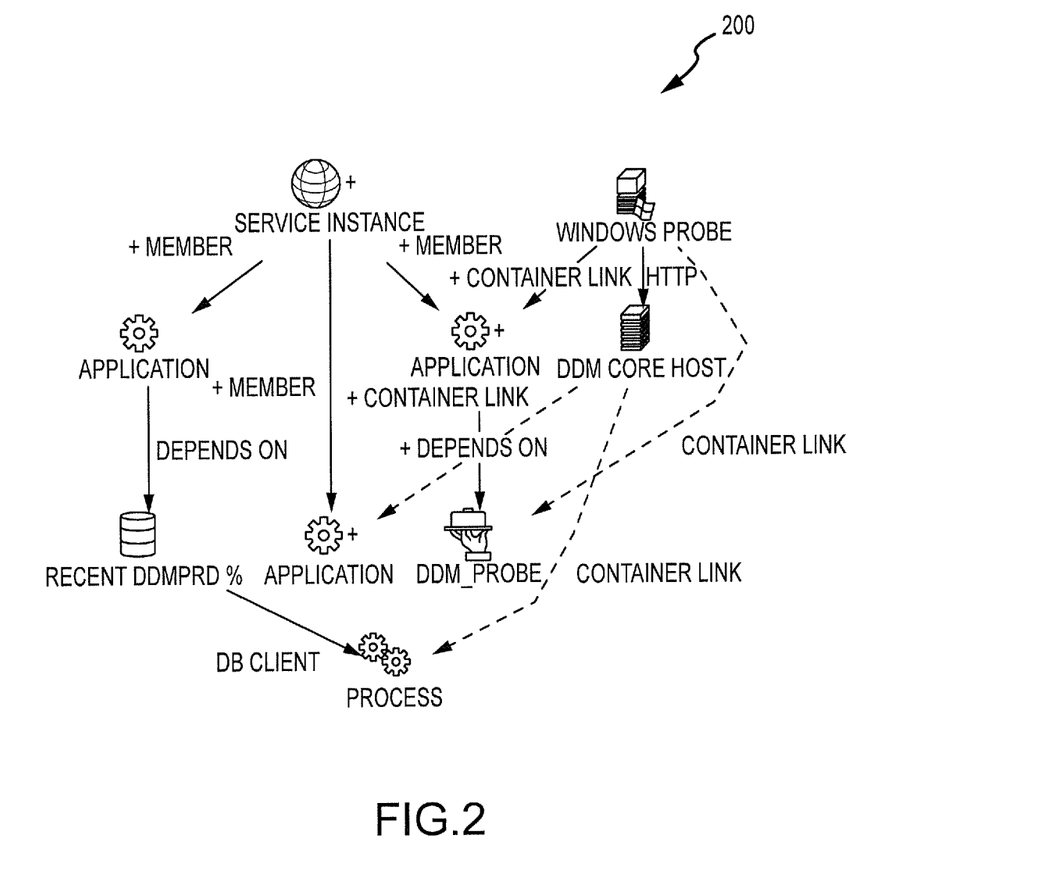
FIG. 2 is a diagram illustrating a fingerprint of a service.

FIG. 2 is a diagram illustrating principles of auto-discovery according to aspects of the present disclosure. More particularly, FIG. 2 illustrates a diagram of a fingerprint (or pattern) 200 of one possible service. In this case, the pattern is for a discovery and dependency mapping service that auto-discovers and defines a signature for a service according to aspects of this disclosure. Aspects of the present disclosure are applicable to various possible services operating in an IT environment, such as applications (e.g., email, document processing), databases, hardware, combinations of the same, and the like.

Figure 3:
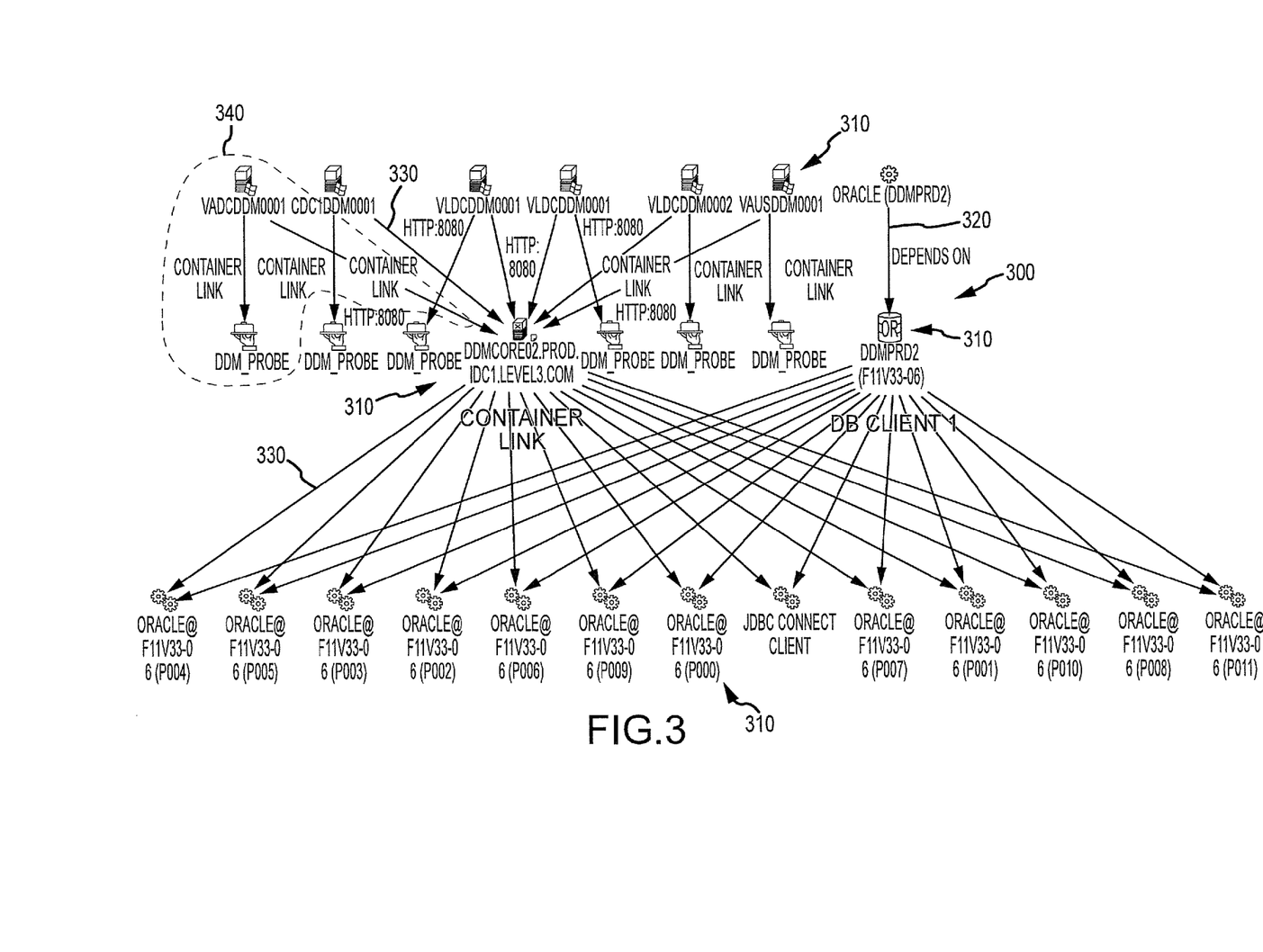
FIG. 3 is a diagram illustrating an auto-discovered signature (physical components, applications, operating systems, databases, dependencies, etc.) of the service associated with the fingerprint shown in FIG. 2, the service signature being based on a system wide scan of an IT infrastructure.

FIG. 3 is a signature 300 of the service of FIG. 2. The service signature is generated based on auto-discovery scan of the IT infrastructure, which in the example of FIG. 3 is an enterprise wide scan, and comparing the service fingerprint to the auto-discovered components of the IT infrastructure.

Hence, FIG. 3 illustrates components 310, dependencies 320, and links 330 of a particular service. In one possible implementation, systems and methods conforming to this disclosure include provisioning auto-discovery agents throughout the IT infrastructure, the auto-discovery agents configured to detect and report changes within the infrastructure.

Figure 4:
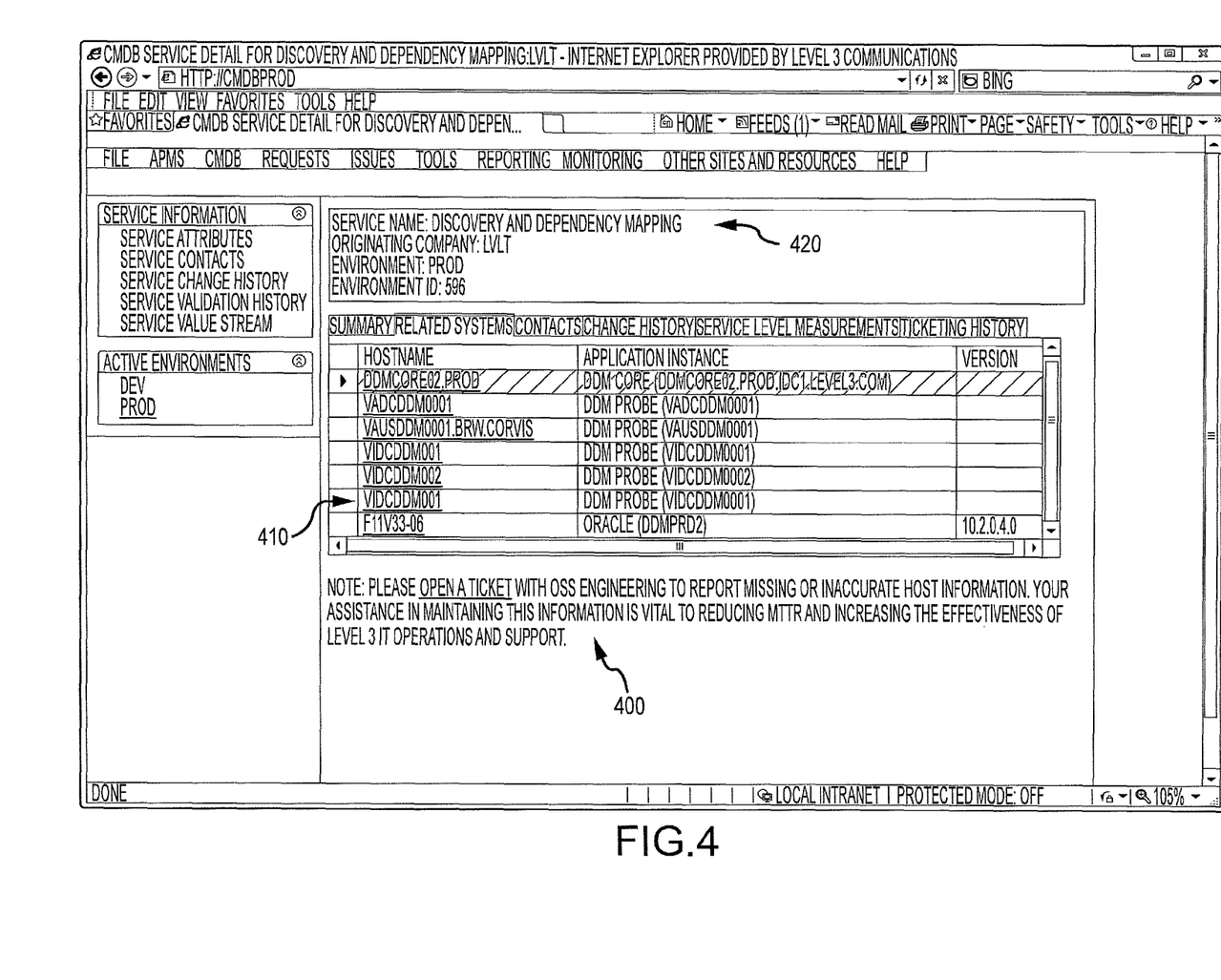
FIG. 4 is a screen shot of extracted memberships of the service of FIG. 3, the extracted memberships being associated with some discrete moment in time, such as the time and date of the last IT system scan.

FIG. 4 is an example of a topology 400 extract based on the information of FIGS. 2 and 3. In this example, extracts 410 of operating system memberships of a service 420 (e.g., discovery and dependency mapping) are illustrated. These memberships may be compared against historical memberships from a previous scan. Additionally, changes to the topology (e.g., membership changes) may be identified. Note that not all of the information between FIG. 4 and FIG. 3 is identical as the extracted members shown in FIG. 4 were identified in a different state of the service signature shown in FIG. 3.

Figure 5:
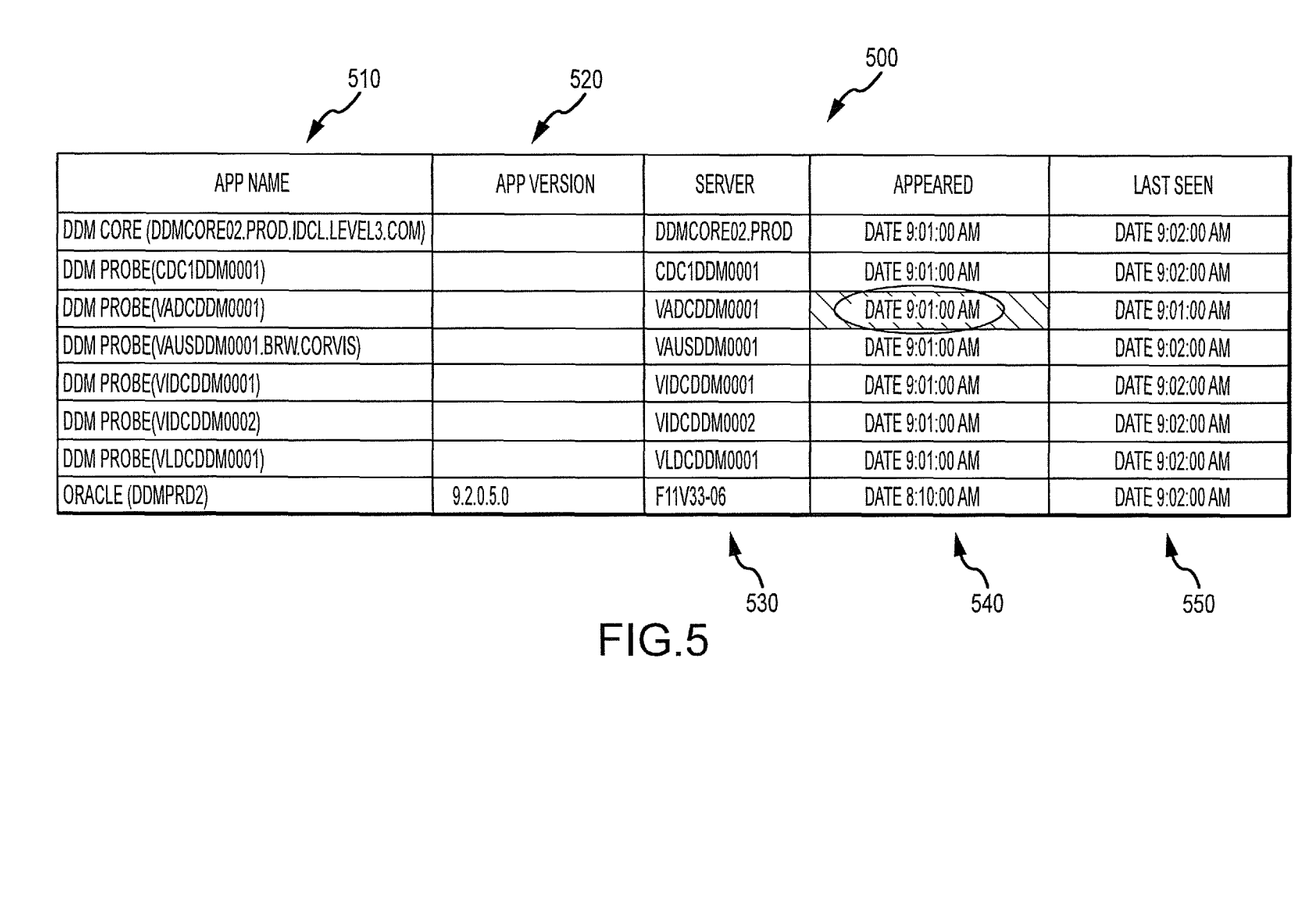
FIG. 5 is a topology change notification page generated by comparing the extracted service memberships at one time against the extracted memberships of the same service at another time, the topology change notification page identifying topology changes to the service such as addition of components, removal of components, changes to components, etc., the topology notification page also identifying items that will expire within some time frame, and items that have been aged-off.

FIG. 5 illustrates a topology change notification page 500 that identifies topology changes to a particular service. The changes to the topology identify the application 510 and the version of the application 520. Also identified is the server 530 where the application resides (loaded and/or running). Finally, the change notification also include the date and time that the new application was discovered 540 as well as the date and time when the application was "last seen" 550 through the current or previous scan. If the last seen date precedes the appeared date, then it is likely the case that the application was removed, uninstalled or other inactivated. Policy based remediation may also occur upon such a change.

Referring more specifically the change data shown in FIG. 5, in the third row, a new application (Probe (vad-cddm00001)) was added to the service since the last scan (see also, FIG. 3, reference number 340). FIG. 5 also illustrates various other applications (and other components) that were identified as having changed since the previous scan.

In one possible arrangement, auto-discovery routines are run at certain time, and from application of the service signature, a given service topology is extracted and saved, with any changes resulting in a change notification or some other form of change notice is provided. In the example shown, auto-discovery is conducted on a schedule and any newly provisioned applications or other changes that occurred since the last discovery are identified. Auto-discovery can occur on any schedule or at the time of a change, and will depend on various factors such as the overall size of the IT environment, the time to conduct a scan and requirements of the IT organization managing the IT environment, among other things. Based on auto-discovery, various methods and systems conforming to aspects of this disclosure may identify changes to an information technology infrastructure, such as additions of physical components (desktop computers, servers, storage, routers, hubs, switches, etc.), alterations of any such systems (software updates, software additions, operating system changes or additions, etc.), dependencies between components and software, physical connections between components, as well as other additions and changes to the IT infrastructure, some or all of which may be stored in a configuration management database.

Figure 6:
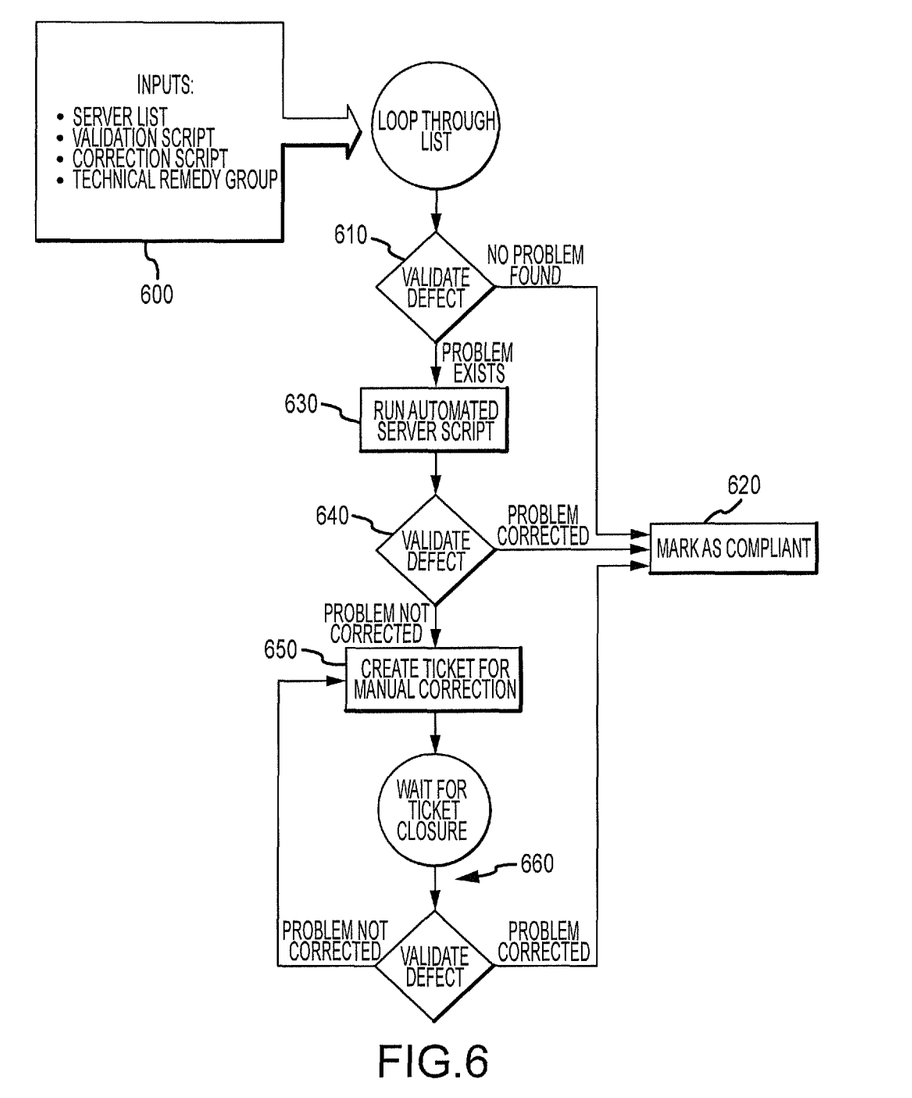
FIG. 6 is a flowchart illustrating a method of policy based remediation or other changes to any components identified as having changed (e.g., those listed in FIG. 5) as well as other remediation or alteration of a service.

FIG. 6 illustrates one example of policy based remediation that occurs for any component of a service identified as having changed, as well as possibly for other aspects of a service. It should be noted that policy based remediation and other changes may be performed for a service regardless of changes to the topology of the service. Moreover, the method of FIG. 6 is also applicable to service component provisioning. IT process automation builds on the auto-discovery and service signature extraction aspects discussed herein. Accordingly, systems and methods conforming to this disclosure provide an inventory of various possible services of an IT infrastructure, and further allow for automatic provisioning and remediation of the IT infrastructure, or automatic control over such provisioning and/or remediation. In one example, provisioning involves configuring systems and providing users with access to data and technology resources (e.g., provides users access to data repositories, grants authorization to network applications and databases based on user identification). In another example, remediation involves identifying a fault or other problem with the IT infrastructure and correcting the fault. Such IT process automation actions, whether provisioning, remediation or otherwise, are based upon an accurate and complete picture of the IT infrastructure, and may be driven or otherwise dependent on IT policies.

Examples of policies that may be applied to some or all members of a service include: ensuring all production operating systems are monitored, ensuring all production databases are backed-up, ensuring performance agents are installed on all operating systems and are reporting performance data, ensuring application contacts are current, and executing decommissioning actions for any removed components. Action may be taken, based on such policies, using automated workflow and remediation to ensure compliance with policies. Actions may involve automated remediation (e.g. install monitoring, backup, or performance collection agents and get them running) or manual steps (e.g. agent won't install, open ticket with off-shore team to fix).

Referring now in more detail to FIG. 6, the method iterates through defined standards and policies for any item (component) identified as having changed, although the method may be performed against other aspects of a service besides those that changed. The method receives as inputs any items identified as having changed, server lists, validation scripts, and correction scripts (operation 600). In one example, for each standard, a generic automation handler process retrieves the list of changed items or configuration items (CIs) that the standard is to be applied to. The list is filtered by exclusions, exemptions and exceptions. The method is applied to or otherwise loops through the list of CIs, i.e. the method is applied to each CI.

When the system is properly provisioned, the method proceeds to validate a defect for a particular changed item (operation 610). Stated differently, the method invokes a validation script to determine if any action (e.g., provisioning or remediation) needs to be taken for the CI. For example, in the case of a database application, the extracted topology information may show that a new database application is installed (and where), is executing, has a connection to some application, but has no set policies. The script is configured to include parameters concerning the particular applications policies, as well as other attributes of the database application that are required for the associated service. For example, the script may include a parameter that a back-up policy must be running for the database application. Hence, the validation script identifies that the policy settings for the new database application are incorrect.

Figure 7:
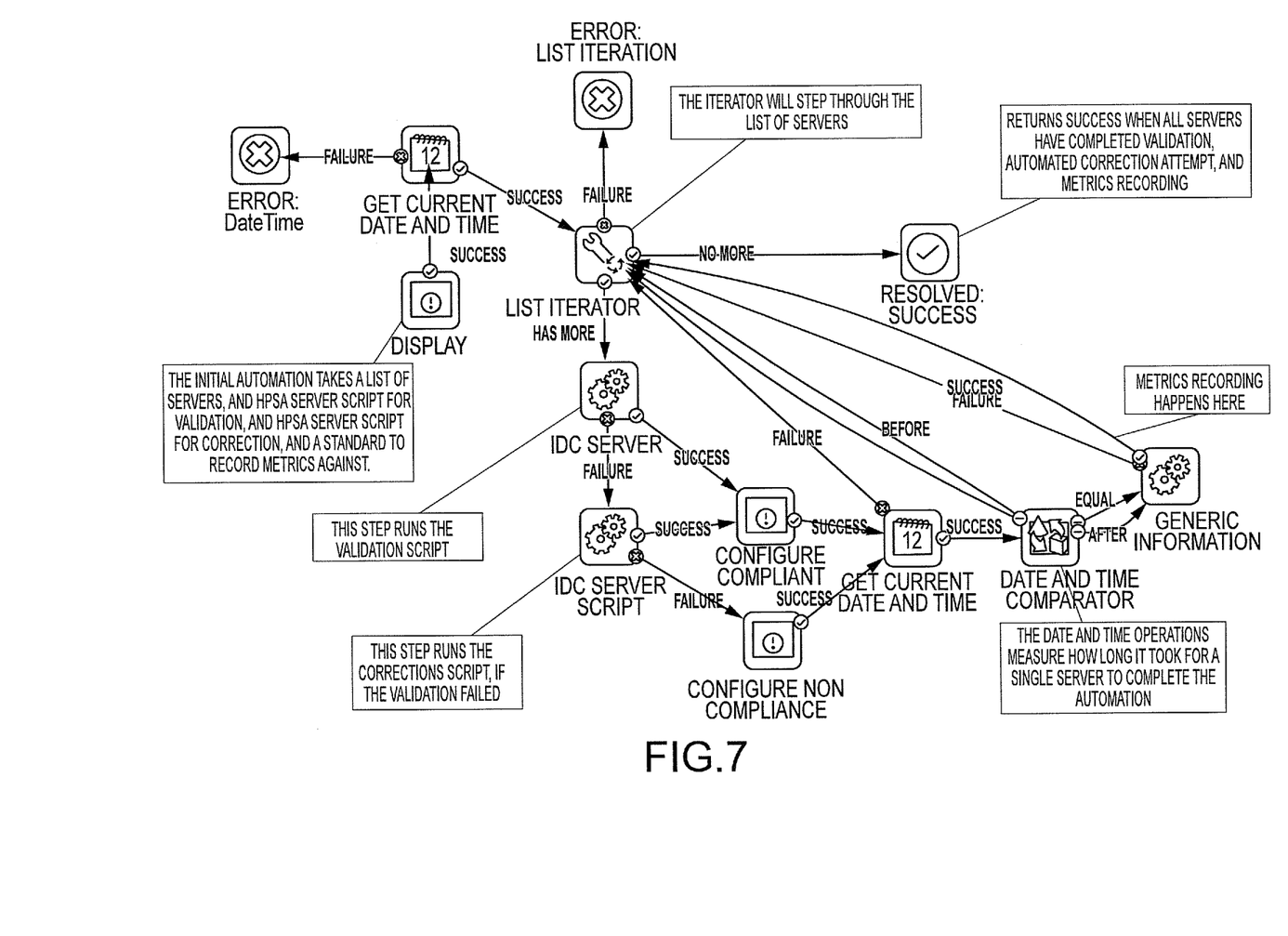
FIG. 7 is a flow diagram illustrating one possible workflow to automatically conduct a remediation of some aspect of a service.

Any systems that pass validation are marked as compliant (operation 620). For systems that fail validation (e.g., incorrect policy setting), correction scripts are invoked to remediate the exception (operation 630). Continuing with the above database example, a script is run to invoke the back-up policy for the database application. FIG. 7, discussed herein, also provides one specific example of an automated workflow for performing remediation. Validation is then re-run following corrective action and systems that pass are marked as compliant (operation 640, operation 630). For example, the method will check to the new database application to ensure the back-up policy is now active. Should the validation fail, the method may automatically open a ticket for systems that continue to fail validation after remediation is attempted (operation 650). Once the ticket is closed, validation will be run again and passing systems marked as compliant (operation 660). When a ticket is opened, it is possible that an IT professional may manually correct the problem (e.g., activate the back-up policy for the database).

FIG. 7 illustrates one particular method (or workflow) and system of automatic policy based remediation of changed components of a particular service. Initially, automation obtains a list of servers, an HPSA server script for validation (or other validation script), an HPSA server script for correction (or other correction script), and a standard to record metrics against. Next, an integrator module will step through the list of severs, and run a validation script. When a validation fails, the appropriate correction script is run. The process proceeds for all servers, and will complete upon successful validation of all servers and/or a corrective action has been attempted. Metrics in this regard are recorded, and compared against the standard to identify the efficacy of the process. It is also possible to determine how long the IT process automation takes for each server.

IT process automation may be used in various different cases, such as OSS credentials provisioning, OSS agent provisioning, and configuration management data integrity. OSS credentials provisioning may include administrative credentials, application specific credentials, and auto-discovery credentials. OSS agent provisioning may include Opsware SA agent deployment, OVO fault monitoring agent deployment, backup agent deployment, and performance data collection agent deployment. Finally, configuration data integrity may include new chassis detect locate, chassis decom, new virtual detect, and service topology change detect.

Figure 8:
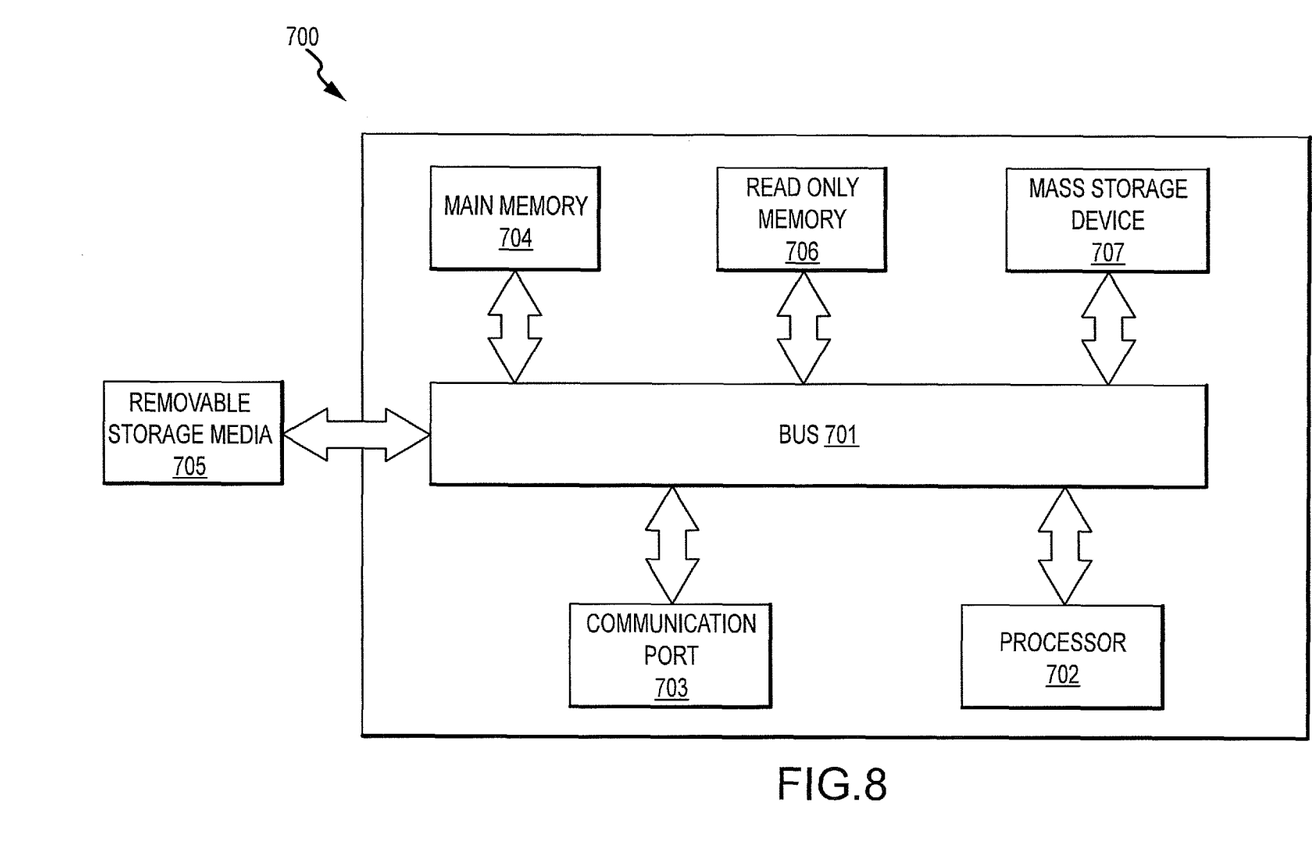
FIG. 8 illustrates an example of a computing device upon which embodiments of the present invention can be implemented and practiced.
Figure 9:
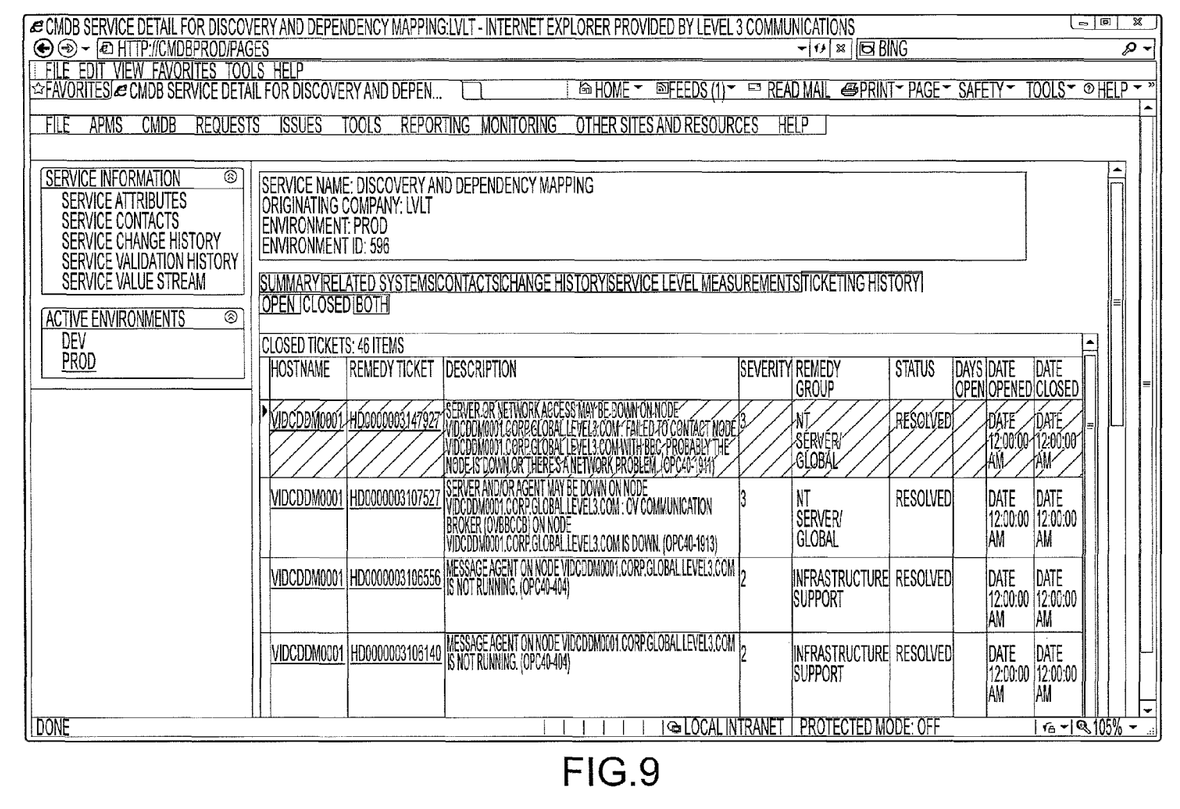
FIG. 9 illustrates a ticketing history of a particular component of a service.
Figure 10:
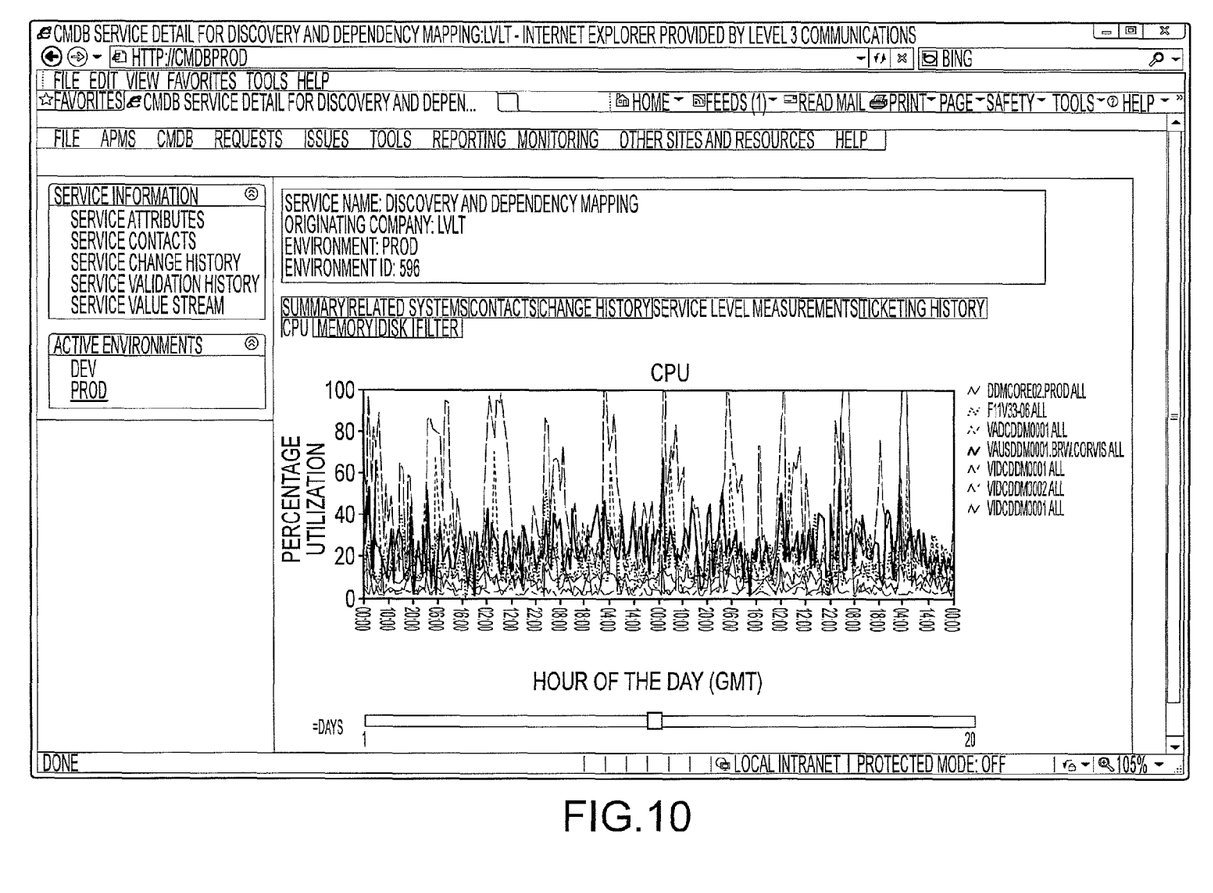
FIG. 10 is a graph of performance measurements of the particular component of the service and other components, the performance being monitored by a performance agent associated with the component and providing data including percentage utilization of a given processor associated with the component, the utilization tracked over time.
Figure 11:
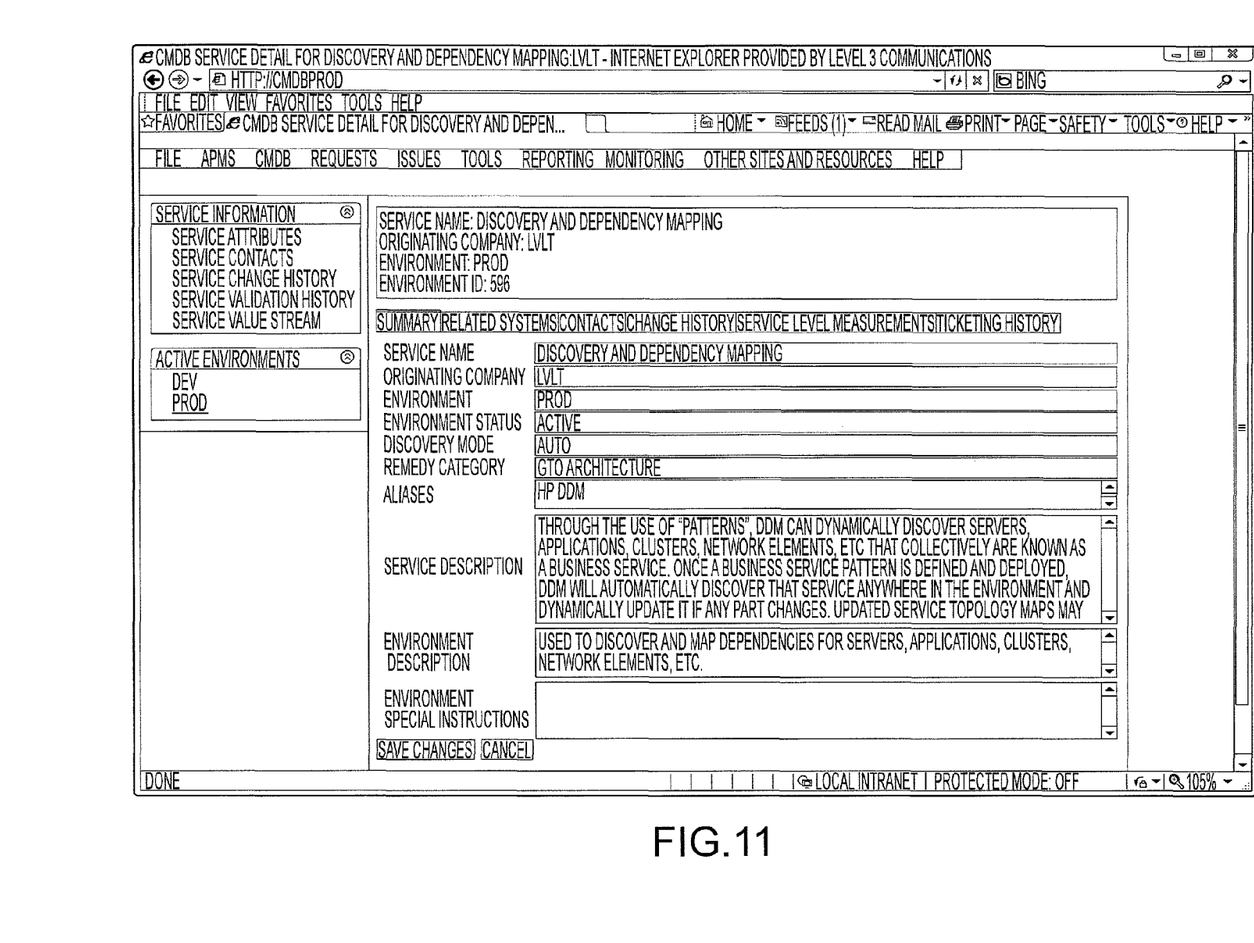
FIG. 11 is a screen shot illustrating meta-data for a service or a component thereof, the metadata including various information concerning the service or component thereof.
Figure 12:
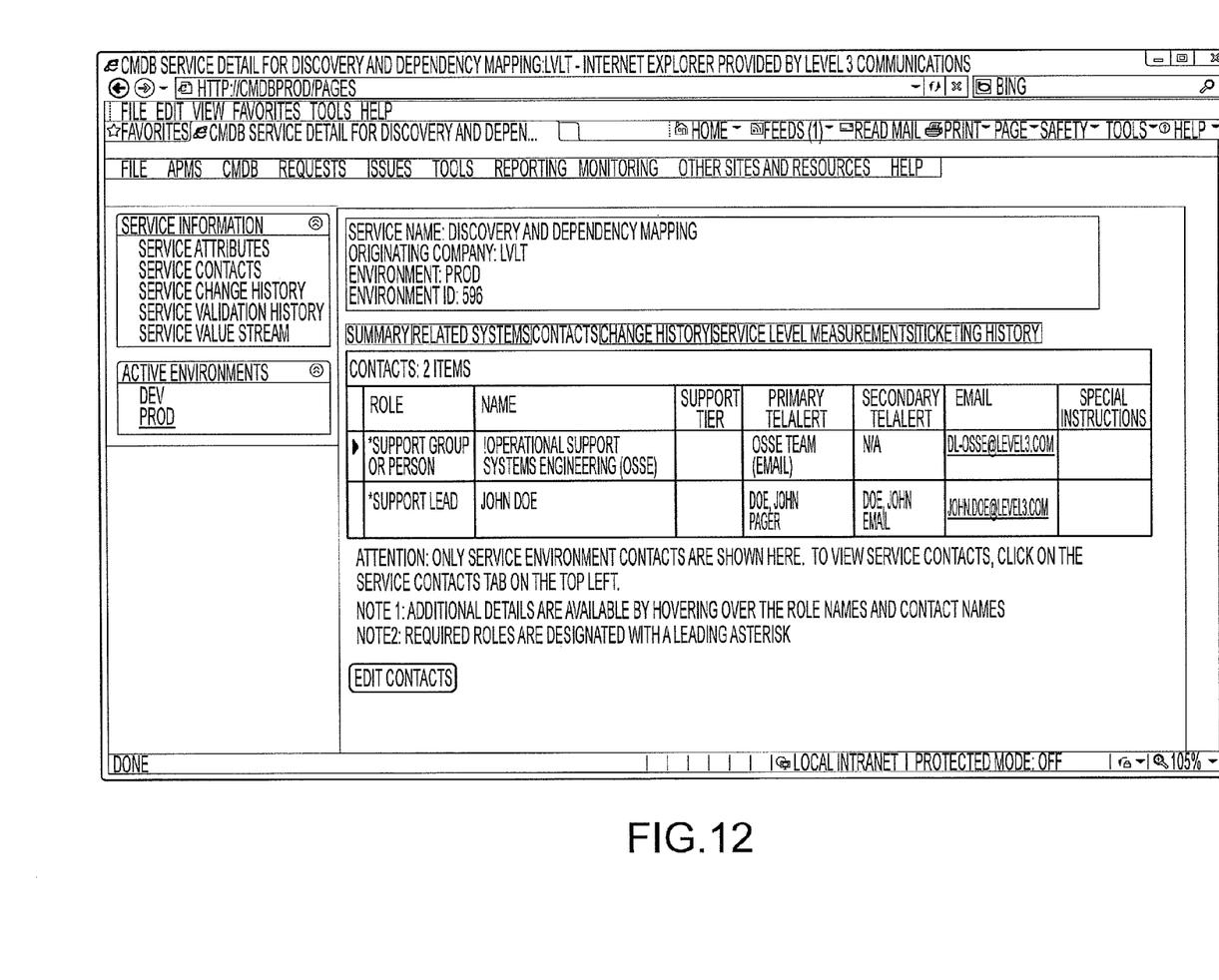
FIG. 12 is a screen shot of contact information for a given service, which may be dynamically updated along with other information concerning the service—in this case, updated when the HR system identifies a change associated with a given contact, such as phone number change, address change, or departure, and may also dynamically change the contact information.

FIG. 8 is a schematic diagram of a computing device 700 upon which embodiments of the present invention may be implemented and carried out. For example, one or more computing devices 700 or similar devices can carry out one or more of the operations shown in the various figures shown herein. As discussed herein, embodiments of the present disclosure include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 700 includes a bus 701, at least one processor 702, at least one communication port 703, a main memory 704, a removable storage media 705, a read only memory 706, and a mass storage 707. Processor(s) 702 can be any know processor, such as, but not limited to, an Intel®, Itanium® or Itanium 2® processor(s), AMD® Opteron® or Athlon MP® processor(s), or Motorola® lines of processors. Communication port(s) 703 can be any of an RS-232 port for use with a modem based dialup connection, a 10/100 Ethernet port, a Gigabit port using copper or fiber, or a USB port. Communication port(s) 703 may be chosen depending on a network such a Local Area Network (LAN), Wide Area Network (WAN), or any network to which the computing device 700 connects. The computing device 700 may be in communication with peripheral devices (not shown) such as, but not limited to, printers, speakers, cameras, microphones, or scanners.

Main memory 704 can be Random Access Memory (RAM), or any other dynamic storage device(s) commonly known in the art. Read only memory 706 can be any static storage device(s) such as Programmable Read Only Memory (PROM) chips for storing static information such as instructions for processor 702. Mass storage 707 can be used to store information and instructions. For example, hard disks such as the Adaptec® family of SCSI drives, an optical disc, an array of disks such as RAID, such as the Adaptec family of RAID drives, or any other mass storage devices may be used.

Bus 701 communicatively couples processor(s) 702 with the other memory, storage and communication blocks. Bus 701 can be a PCI/PCI-X, SCSI, or USB based system bus (or other) depending on the storage devices used. Removable storage media 705 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present disclosure may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method of managing an information technology system comprising:
   automatically detecting, using at least one processor, a topology change of a service in an information technology environment, the topology change involving a change to at least one component of the service; and
   at least one of automatically provisioning or automatically remediating the at least one component of the service based on a policy;

wherein automatically detecting a topology change of a service in an information technology environment, the topology change involving a change to at least one component of the service comprises:
obtaining a first auto-discovery scan of the information technology environment;
obtaining a pattern for the service;
applying the pattern to the auto-discovery scan to obtain a first information technology topology of the service;
obtaining a second auto-discovery scan of the information technology environment at a time different from the first scan;
applying the pattern to the second auto-discovery scan to obtain a second information technology topology of the service; and
automatically detecting the topology change of the service by identifying differences between the first auto-discovery scan and the second auto-discovery scan.

2. The method of claim 1 wherein each scan comprises a discovery and dependency mapping of the IT environment, and further comprising:
generating a first signature for the service, the first signature for the service including a first discovery and dependency mapping of the IT environment relevant to the service;
extracting service memberships of the service from the first signature to generate the first information technology topology, and saving the first information technology topology to a configuration management database;
generating a second signature for the service, the second signature for the service including a second discovery and dependency mapping of the IT environment relevant to the service;
extracting service memberships of the service from the second signature to generate the second information technology topology, and saving the second information technology topology to a configuration management database; and
automatically detecting the topology change of the service by comparing the first information technology topology with the second information technology topology.

3. The method of claim 1 further comprising:
executing an automatic remediation operation, using at least one processor, to conform the at least one component of the service to the policy when the at least one component does not conform to the policy.

4. The method of claim 3 further comprising:
executing an automated workflow to perform execution of the automatic remediation operation.

5. The method of claim 3 further comprising:
automatically opening a ticket for manual remediation of the at least one component of the service to conform the component to the policy when the automatic remediation of the component to conform to the policy fails.

6. The method of claim 3 wherein the policy comprises one or more of a back-up policy, a monitoring policy, a performance data gathering policy, a decommissioning policy, and a contact policy.

7. The method of claim 1 further comprising:
executing an automatic provisioning operation to provision the at least one component of the service in conformance with the policy.

8. The method of claim 1 wherein the one or more processors coupled with one or more non-transitory computer readable media containing instructions, which when executed, perform the operations of:
executing an automatic provisioning operation to provision the at least one component of the service in conformance with the policy.

9. A system for information technology management comprising:
one or more processors coupled with one or more non-transitory computer readable media containing instructions, which when executed, perform the operations of:
automatically detecting a topology change of a service in an information technology environment, the topology change involving a change to at least one component of the service; and
at least one of automatically provisioning or automatically remediating the at least one component of the service based on a policy;
wherein the operation of automatically detecting a topology change of a service in an information technology environment, the topology change involving a change to at least one component of the service comprises:
obtaining a first auto-discovery scan of the information technology environment;
obtaining a pattern for the service;
applying the pattern to the auto-discovery scan to obtain a first information technology topology of the service;
obtaining a second auto-discovery scan of the information technology environment at a time different from the first scan;
applying the pattern to the second auto-discovery scan to obtain a second information technology topology of the service; and
automatically detecting the topology change of the service by identifying differences between the first auto-discovery scan and the second auto-discovery scan.

10. The system of claim 9 wherein each scan comprises a discovery and dependency mapping of the IT environment, and wherein the one or more processors coupled with one or more non-transitory computer readable media containing instructions, which when executed, perform the operations of:
generating a first signature for the service, the first signature for the service including a first discovery and dependency mapping of the IT environment relevant to the service;
extracting service memberships of the service from the first signature to generate the first information technology topology, and saving the first information technology topology to a configuration management database;
generating a second signature for the service, the second signature for the service including a second discovery and dependency mapping of the IT environment relevant to the service;
extracting service memberships of the service from the second signature to generate the second information technology topology, and saving the second information technology topology to a configuration management database; and
automatically detecting the topology change of the service by comparing the first information technology topology with the second information technology topology.

11. The system of claim 9 wherein the one or more processors coupled with one or more non-transitory computer readable media containing instructions, which when executed, perform the operations of:
executing an automatic remediation operation to conform the at least one component of the service to the policy when the at least one component does not conform to the policy.

12. The system of claim 11 wherein the one or more processors coupled with one or more non-transitory computer readable media containing instructions, which when executed, perform the operations of:
   executing an automated workflow to perform execution of the automatic remediation operation.

13. The system of claim 11 wherein the one or more processors coupled with one or more non-transitory computer readable media containing instructions, which when executed, perform the operations of:
   automatically opening a ticket for manual remediation of the at least one component of the service to conform the component to the policy when the automatic remediation of the component to conform to the policy fails.

14. The system of claim 11 wherein the policy comprises one or more of a back-up policy, a monitoring policy, a performance data gathering policy, a decommissioning policy, and a contact policy.

* * * * *